Oct. 18, 1938.   W. R. WILEY   2,133,837
CLIP
Filed Nov. 9, 1936
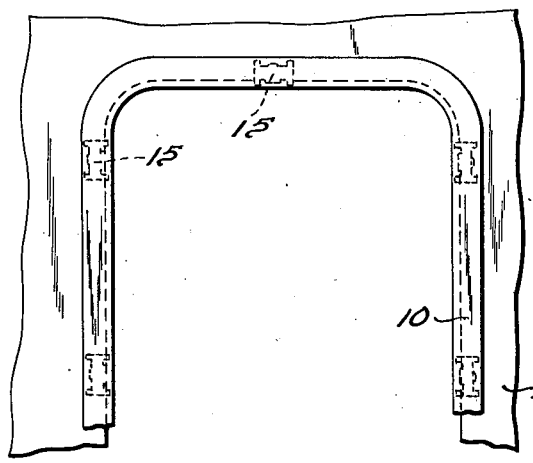
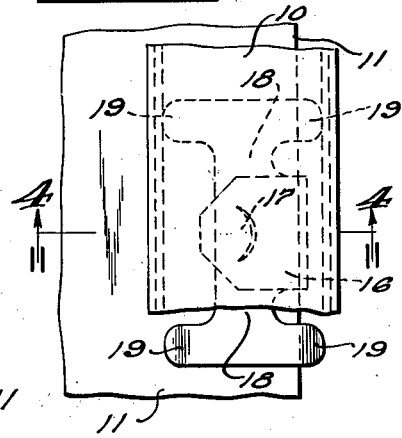
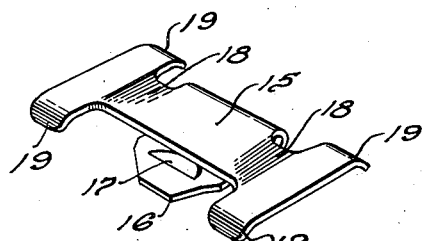
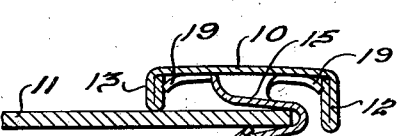
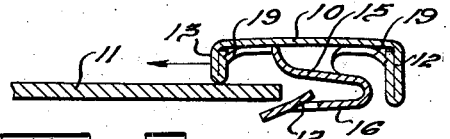
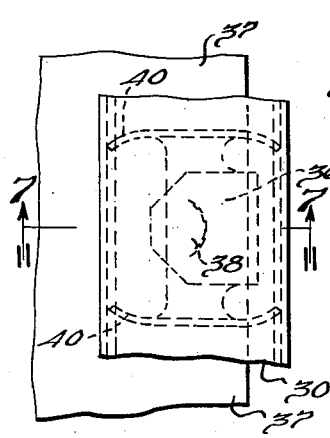
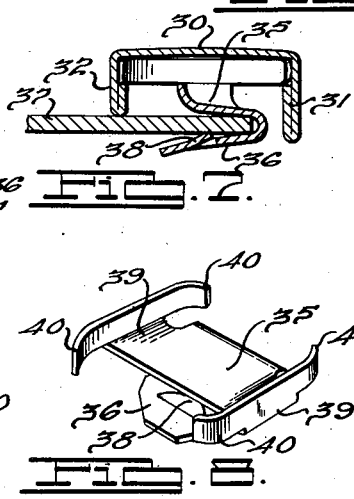
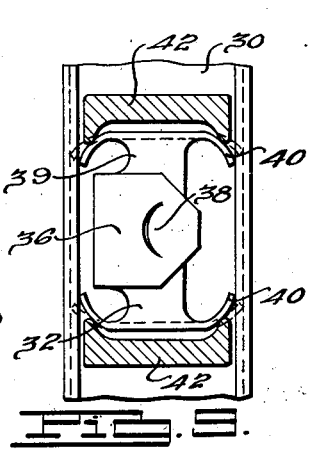
INVENTOR.
William R. Wiley.
BY
Harness, Dickey, Pierce & Hann
ATTORNEYS.

Patented Oct. 18, 1938

2,133,837

UNITED STATES PATENT OFFICE 2,133,837

CLIP

William R. Wiley, Detroit, Mich.

Application November 9, 1936, Serial No. 109,921

6 Claims. (Cl. 189—88)

This invention relates to clips for mounting sheet metal molding strips. More particularly, it relates to a novel and extremely simple form of sheet metal clip primarily adapted for retaining a relatively shallow channel shaped molding strip in predetermined position adjacent the marginal edge of a sheet metal panel.

It is a primary object of the present invention to provide a clip which is extremely simple in construction, easily installed, and one which provides an exceptionally strong locking engagement not only with the molding strip in which it is mounted but also with the sheet metal panel upon which the molding strip is to be secured.

The present invention contemplates the provision of a clip construction in which the body portion of the clip is provided with a pair of arcuately disposed transversely extending portions which are normalized upon arcs of slightly greater radius than that upon which they will inherently be disposed when seated within the molding strip which the clips of the present invention serve to support. This arcuate tensioning of these transversely extending portions serves to provide a firm and positive locking engagement between the clips and the molding strip thus insuring that the clips will be positively retained in predetermined position within the molding strip.

In addition, the clips of the present invention have a U shaped central portion integrally connected to the arcuate portions referred to above which U shaped portion is adapted to receive, between the arms thereof, the marginal edge of a sheet metal panel and one arm of the U is provided with an up-struck lug serving to lock the clip in predetermined position with respect to the marginal edge of the panel.

Still further, the present invention contemplates the provision of a modified form of clip construction in which the transversely extending portions of the clip are so constructed and arranged that they serve to positively preclude relative longitudinal movement of the molding strip with respect to the clips mounted therein.

Many other and further objects, advantages, and features of the present invention will become more clearly apparent from the following specification when considered in connection with the accompanying drawing forming a part thereof.

In the drawing:

Figure 1 is a fragmentary elevational view illustrating a sheet metal panel having a molding strip mounted adjacent the edges thereof by means of the improved clips;

Fig. 2 is an enlarged fragmentary elevational view illustrating one of the improved clips utilized for mounting a molding strip;

Fig. 3 is an enlarged perspective view of a clip embodying the novel features of the present invention;

Fig. 4 is a transverse sectional view taken on the line 4—4 of Fig. 2 illustrating in detail the manner in which the improved clip is mounted within the molding strip and secured to a sheet metal panel;

Fig. 5 is a transverse sectional view similar to Fig. 4 illustrating in detail the manner in which the molding strip is mounted;

Fig. 6 is a fragmentary elevational view illustrating a modified form of clip utilized for securing a modified form of molding strip in position;

Fig. 7 is a transverse sectional view taken substantially on the line 7—7 of Fig. 6 illustrating in detail the cross-sectional configuration of the modified form of clip and molding strip;

Fig. 8 is an enlarged perspective view of the modified form of clip shown in Figs. 6 and 7.

Fig. 9 is a fragmentary elevational view illustrating the manner in which the modified forms of clips may be installed in the modified molding strip.

With more particular reference to the drawing, it will be readily understood that the improved clips of the present invention may be utilized in many and various different installations, but in the form shown, are primarily adapted for securing a shallow channel shaped molding strip 10 adjacent the marginal edge of a sheet metal panel 11. As many of the clips as are either necessary or desirable may be utilized and these clips may be longitudinally spaced throughout the length of the molding strip and located at such points as will produce the necessary locking engagement between the molding strip and the panel.

While any suitable sort of molding strip may be utilized in connection with the clips of the present invention, a molding strip having a cross-sectional configuration substantially as is shown in Figs. 4 and 5 has been found particularly adaptable. This molding strip 11 is provided with side walls 12 and 13, the wall 12 being of slightly greater width than the wall 13 in order more effectively to conceal the marginal edge of the sheet metal panel with which the molding strip is associated. While these molding strips may be of single wall construction, in the present invention it has been found that it is particularly desirable, as will hereinafter become clear, to fold the marginal edges of the walls 12 and 13 upon themselves to provide a double wall structure substantially as is shown. This double wall structure provides increased transverse strength which is particularly desirable due to the tendency which the clips of the present invention have to spread the channel members, and, consequently, greatly increases the strength of the locking engagement provided by the clips.

The clips in the particular form of the present invention include a body portion 15 which has a tongue 16 integrally connected thereto and bent with respect to the body portion to form a generally U shaped central portion for the clip. This tongue 16 has an up-struck lug or tang 17 formed therein which, when the edge of the sheet metal panel is inserted between the arms of the U shaped portion of the clip, will firmly engage and dig into the surface of the metal panel 11 thus firmly locking the body portion of the clip in predetermined relation with respect to the panel.

Projecting longitudinally from each of the opposite ends of the body portion are a pair of tongues 18 which tongues each have laterally projecting lugs 19 extending from points adjacent the ends thereof. These lugs 19 together with the end portions of the tongues 18 are bent into substantially arcuate form and have an over-all transverse width slightly greater than the inside transverse dimensions of the molding strip 11 with which the clips are to be associated. After the clips have been bent to substantially the form shown in Fig. 3, they are heat treated or tempered in order to materially increase their hardness and resiliency and then may be forced into the channel shaped molding strip 11.

It will be readily appreciated that as the clips are forced into the channel shaped molding strip 11, the arcuate end portions of the clips will be bent to lie along arcs of substantially smaller radius than that on which they were normalized during heat treatment and the ends of these lugs will have a constant inherent tendency to spring outwardly against the walls of the channel member in which they have been inserted. Due to the hardness of the metal from which the clips are formed, these lugs will firmly and positively engage the walls of the channel and lock the clips in position therein. The clips may be disposed at intervals throughout the length of the channel and will each be firmly seated therein. It will be apparent that the molding strip as a whole may be slid on to the marginal edge of the sheet metal panel 11 with which it is to be associated and the marginal edge of this panel will be received by the arms 15 and 16 of the U shaped central portion of the clip and will firmly be locked into position by means of the lug or projection 17. Thus it will be understood that the clips will serve the purpose of positively locking the molding strip firmly in predetermined position with respect to the marginal edge of the sheet metal panel.

In Figs. 6 to 9 inclusive, is illustrated a somewhat modified form of the clip of the present invention in which a type of clip structure and holding is shown which is especially designed to preclude longitudinal movement of the clips with respect to the molding member in which they are mounted. However, it will be understood that the particular manner in which these clips are secured to the sheet metal panel is substantially the same as has been described above. In this form of the invention, a somewhat deeper channel section molding strip is provided having a side wall 31 somewhat deeper than the opposite side wall 32. The marginal edges of each of these side walls are folded upon themselves to provide a neat exterior appearance and to some extent reinforce the molding strip as a whole. It will be noted that the marginal edges of these side walls terminate somewhat short of the channel base in order to leave room for the mounting of the improved clips. In this form of the invention, the clips each comprise a central body portion 35 which has a tongue 36 integrally connected thereto and bent substantially parallel to the body portion to provide a U shaped recess adapted to receive and engage the marginal edge of a sheet metal panel 37. As in the forms of the invention described above, the arm 36 of this U shaped portion is provided with an up-struck lug or tang 38 which serves to grip firmly the marginal edge of the sheet metal panel and retain the clip firmly seated in position with respect thereto.

The body portion of the clip 35 has longitudinally projecting tongues 39 extending therefrom, the ends of which are bent upwardly and have arcuately bent laterally projecting lugs 40 extending from each of the opposite sides thereof. The clip in its completed form is shown in Fig. 8 of the drawing. After the sheet metal member of which the clip is composed has been bent to substantially the form shown in Fig. 8, it is heat treated or tempered as described above to materially increase its hardness and it will be noted that the over-all width of the end portion, including the lugs 40, is slightly greater than the maximum internal width of the molding strip 30 which the clip serves to mount.

Clips of the type described in this modified form of the invention may be conveniently mounted within the molding strip 30 by means of a tool of suitable conventional design which may be in the form of a pair of tongs having jaws 42. As is clearly seen by reference to Fig. 9, these jaws 42 are constructed of a configuration such that as the clip is gripped therebetween, the projecting lugs 40 will be bent to substantially the position shown in full lines in Fig. 9 thus facilitating the insertion of the clip into the molding strip. After the clip has been placed in the base of the channel of the molding strip, the tongs may be removed and the lugs 40, due to their inherent resilience, will spring outwardly against the interior walls of the channel member 30 and engage these walls in an area above the marginal edges of the inturned side walls. The marginal edges of these side walls will serve to prevent displacement of the clip from the position in which it is seated within the molding strip and the arcuate end portions of the clip serve to positively preclude longitudinal movement of the clip within the molding strip in either direction.

While it will be readily understood that the generic inventive principles found in both forms of the clip disclosed in the present application are quite similar, each clip has features slightly distinct from the other which make it desirable for certain specific installations. It will be readily understood, likewise, that the modified form of clip is also extremely adaptable for mounting a molding strip in a predetermined position with respect to the marginal edge of a sheet metal panel and serves to obtain a firm and positive locking engagement between not only the clip and the molding strip but also between the clip and the sheet metal panel.

Many other and further objects, advantages, and features of the present invention falling within the scope of the invention as defined in the subjoined claims will become clearly apparent to those skilled in the art.

What is claimed is:

1. A clip for securing a relatively shallow channel shaped molding strip in position adjacent the marginal edge of a sheet metal panel comprising a sheet metal member bent into U-shape in its central portion to receive the edge of said sheet metal panel, tongues projecting in opposite directions from said body portion, said tongues having integrally formed lugs projecting from opposite sides thereof adjacent the ends thereof; said lugs adapted to be received within said molding strip to secure said clip in position therein.

2. A clip for securing a relatively shallow channel shaped molding strip in position adjacent the marginal edge of a sheet metal panel comprising a sheet metal member having a body portion bent into substantially U-shape and having an upstruck lug in one of the arms thereof whereby to lock said clip in engagement with the marginal edge of a sheet metal panel, and integrally formed oppositely extending tongues on said body portion, each having opposite laterally projecting lugs formed thereon for securing said clip in position within said molding strip.

3. A clip for mounting a shallow channel shaped molding strip comprising a sheet metal member having transversely disposed arcuate portions at its opposite ends, said arcuate portions facing each other and normalized upon arcs of greater radius than that which they must assume when confined between the walls of said channel whereby to preclude longitudinal movement of said clip with respect to said molding strip.

4. In combination with a relatively shallow channel-shaped molding strip, a panel to which said molding strip is to be secured and a clip for securing said molding strip in position adjacent the marginal edge of said panel, said clip comprising a sheet metal member having its central portion bent upon itself, and a pair of portions projecting therefrom, each of said projecting portions being preformed to provide transversely extending arcuately curved members adapted to seat in locking position within said molding strip, the central portion of said clip being adapted to seat in locking position on the marginal edge of said panel.

5. In combination, a relatively shallow channel-shaped molding strip, a sheet metal panel and a clip for securing said molding strip in position on the marginal edge of said panel, said clip comprising a central portion bent upon itself to engage and lock said clip on the marginal edge of said panel and preformed to provide transversely extending arcuate portions adapted to seat in locking engagement within the channel of said molding strip, said clip as a whole being formed of relatively high carbon steel and tempered to a hardness substantially harder than the molding and panel with which it is associated.

6. A clip for securing a relatively shallow channel-shaped molding strip to a marginal edge of a sheet metal panel, said clip having its central portion bent upon itself and provided with an upstruck lug therein whereby to receive and lock said clip upon the marginal edge of said panel, and portions extending from said central portion and having laterally projecting lugs at opposite sides thereof, the ends of said extending portions and said lugs being bent to generally arcuate form to secure said clip within a channel-shaped molding strip.

WILLIAM R. WILEY.